UNITED STATES PATENT OFFICE.

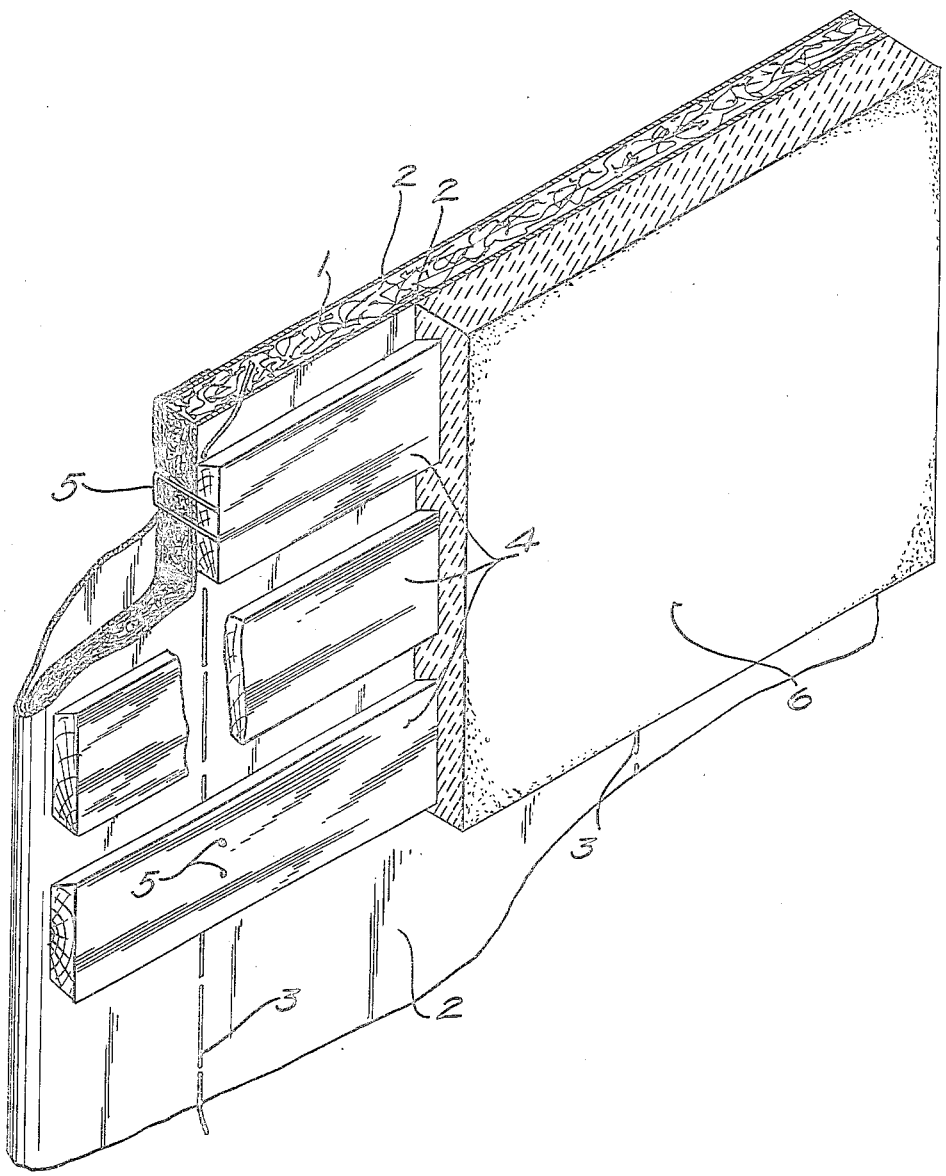

GEORGE H. ELLIS, OF ST. PAUL, MINNESOTA.

COMPOSITE LATH AND HEAT-INSULATING MATERIAL.

1,126,187.   Specification of Letters Patent.   Patented Jan. 26, 1915.

Application filed May 9, 1914. Serial No. 837,556.

*To all whom it may concern:*

Be it known that I, GEORGE H. ELLIS, a citizen of the United States, residing at St. Paul, in the county of Ramsey and State of Minnesota, have invented certain new and useful Improvements in Composite Lath and Heat-Insulating Material; and I do hereby declare the following to be a full, clear, and exact description of the invention, such as will enable others skilled in the art to which it appertains to make and use the same.

My present invention has for its object to provide an improved composite lath and heat insulating building material and is in the nature of a modification of the composite lath and heat insulating building material disclosed and claimed in my companion application Serial No. 837,555 filed of even date herewith and of the same title; and to such ends, generally stated, the invention consists of the novel devices and combinations of devices hereinafter described and defined in the claims.

The invention is illustrated in the single drawing which is a perspective view partly in section and with some parts broken away.

In this form of the composite material, the body sheet is made up of an insulating filler 1 which is contained between a pair of facing sheets 2, preferably of a good grade of building paper, such, for example, as what is known as "red rosin" paper, "craft" paper, or "Neponsit." The insulating filler 1 is preferably tow or flax or hemp fibers loosely matted together and confined between the sheets 2, the said sheets being preferably overlapped at the edges of the material and fastened together by edge and intermediate lines of stitches 3 sewed completely through the said parts 1 and 2 and securing them together to prevent shifting of the filler between the sheets. Wooden lath 4, preferably having beveled edges, are placed in parallel arrangement on the outer faces of one of the sheets 2, and the said parts 1, 2 and 4 are secured together, preferably by staples 5, or by nails driven through the said parts 1 and 2 and into the said lath. When a cheap grade of material is required, a paper facing 2 may be a cheap paper, not in all instances water proof, but where a better grade is required, a water proof paper will be employed.

In the drawings, the numeral 6 indicates plaster which is applied to the lath and against the adjacent facing sheet 2. The lath make the composite material transversely rigid, but permit it to be bent longitudinally or transversely of the lath. The beveled edges of the lath afford dove-tailed channels between the lath, which are well adapted to hold the plaster in place. The numerous air cells in the insulating material 1 make it an extremely good heat insulation, and further, prevent passage of air through the composite material.

What I claim is:

A composite lath and heat insulating material comprising a cellular fibrous filler, a pair of facing sheets between which said filler is contained, wooden lath applied to one of the said facing sheets and metallic fastening devices passed through said facing sheets and filler and into said lath and securing the said parts together.

In testimony whereof I affix my signature in presence of two witnesses.

GEORGE H. ELLIS.

Witnesses:
BERNICE G. WHEELER,
HARRY D. KILGORE.